Patented June 5, 1951

2,555,330

UNITED STATES PATENT OFFICE 2,555,330

INSECT REPELLENT

Marshall Gates, Bryn Mawr, Pa., assignor to the United States of America as represented by the Secretary of the Army No Drawing. Application January 10, 1949, Serial No. 70,140

2 Claims. (Cl. 167—33)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to insect repellents.

I have found that the application of dipyridine, a compound having the structural formula

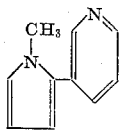

and also known as nicotyrine, to the human skin or to a fabric affords effective protection against insect bites, by repelling insects, particularly Aedes aegypti and Anopheles quadrimaculatus.

A number of tests to measure the repellency of dipyridine against Aedes aegypti was conducted by smearing the compound on the arms of test personnel, who then thrust their arms into cages containing Aedes aegypti. The arms were exposed for 30-minute intervals at 3 minutes each until the first insect bite.

Tests to measure the repellency of dipyridine impregnated fabrics against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of dipyridine affords protection against Aedes aegypti for an average of 280 minutes. Against Anopheles quadrimaculatus, an average repellency time of 69 minutes was noted in analogous test.

It was found that fabric impregnated with dipyridine remained repellent to Aedes aegypti for over 10 successive days.

For ease of application to the skin, the dipyridine may be incorporated in a suitable inert liquid or solid carrier such as mineral oil, alcohol, petrolatum, etc. For ease and uniformity of application to the fabric, the dipyridine may be applied to the fabric in an inert solvent, such as alcohol, ether, etc.

Having thus described my invention, I claim:

1. An insect-repellent fabric comprising fabric impregnated with dipyridine.

2. A process of repelling insects comprising applying dipyridine to the region from which the insects are to be repelled.

MARSHALL GATES.

REFERENCES CITED

The following references are of record in the file of this patent:

UNITED STATES PATENTS

| Number | Name | Date |
|---|---|---|
| 2,400,006 | Jones et al. | May 7, 1946 |

OTHER REFERENCES

Hackh, "Chemical Dictionary," Blakiston Co., Philadelphia, third ed., 1944. Page 281, entry "dipyridine."

OSRD, Insect Control Committee Report No. 28, Interim Report No. 0-94, May 18, 1945, page 29, 0-2906, Nicotinamide. Publication date, Aug. 1, 1947. 167-OSRD.

Richardson, "Toxicity of Dipyridyls and Certain Other Organic Compounds as Contact Insecticides." J. of Agricultural Research, Washington, D. C., vol. 33, No. 7, Oct. 1, 1926, pp. 597–609. Page 598 considered particularly pertinent. 167-33.

Richardson et al., Toxity of Dipyridyls, from Chemical Abstracts, volume 21, page 472, 1927.